United States Patent
Distler et al.

[11] 3,853,596
[45] Dec. 10, 1974

[54] METHOD OF GROWING A SINGLE-CRYSTAL ON A SINGLE-CRYSTAL SEED

[76] Inventors: Grigory Issakovich Distler, ulitsa Vavilova, 48, kv. 211; Anatoly Nikolaevich Lobachev, ulitsa Fersmana, 3, kv. 68; Vasily Platonovich Vlasov, Flotskaya ulitsa, 13 korpus 1, kv. 214; Oleg Konstantinovich Melnikov, Leninsky prospekt, 92/2, kv. 64; Nina Sergeevna Triodina, Universitetsky prospekt, 4, kv. 501, all of Moscow, U.S.S.R.

[22] Filed: July 7, 1972

[21] Appl. No.: 269,884

[30] Foreign Application Priority Data
July 7, 1971 U.S.S.R. .............................. 1670901

[52] U.S. Cl. .............. 117/69, 23/301 R, 117/71 R, 117/100 B, 117/100 S, 117/201, 117/215, 117/217, 204/192
[51] Int. Cl. ............................................. B44d 1/16
[58] Field of Search ........... 117/71 R, 100 B, 100 S, 117/239, 69, 201, 215, 217; 23/301 R; 204/192

[56] References Cited
UNITED STATES PATENTS

| | | | |
|---|---|---|---|
| 1,998,334 | 4/1935 | Rupp | 117/100 B |
| 2,782,676 | 2/1957 | Osterberg | 117/71 R |
| 2,895,858 | 7/1959 | Sangster | 117/100 S |
| 3,224,333 | 12/1965 | Kolk et al. | 117/239 |
| 3,399,072 | 8/1968 | Pulliam | 117/236 |
| 3,498,836 | 3/1970 | Gambino | 117/236 |
| 3,518,636 | 6/1970 | Pulliam et al. | 117/239 |
| 3,574,679 | 4/1971 | Pulliam et al. | 117/239 |
| 3,591,347 | 8/1968 | Rabamaier et al. | 117/201 |
| 3,649,351 | 3/1972 | Grabmaier | 117/201 |

OTHER PUBLICATIONS

Journal of Chemical Education, August, 1969, pg. 486, "A Flotation Method for Growing Large Single Crystals."

Primary Examiner—William D. Martin
Assistant Examiner—Dennis C. Konopacki
Attorney, Agent, or Firm—Holman & Stern

[57] ABSTRACT

A method of growing a single-crystal on a single-crystal seed comprises deposition prior to the beginning of crystallization onto the surface of the single-crystal seed to be overgrown, of a continuous layer of a material having at least one of the characteristics of chemical composition and/or structure which differs from that of the material of the single-crystal seed, said product acquiring polarization properties under the influence of the single-crystal seed which are retained during crystallization. The thickness of the layer is selected in such a manner as to eliminate the defects of the surface of the single-crystal seed and to retain polarization properties acquired from the single-crystal seed. Then the single-crystal seed with said layer deposited thereon is placed into a crystallization medium under conditions required for growing a single-crystal on said layer of the single-crystal seed.

12 Claims, 1 Drawing Figure

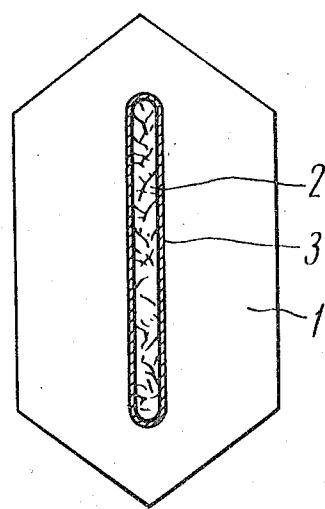

METHOD OF GROWING A SINGLE-CRYSTAL ON A SINGLE-CRYSTAL SEED

The present invention relates to a method of growing single-crystals on single-crystal seeds.

According to known methods of growing single-crystals on single-crystal seeds, a single-crystal seed is placed into a crystallization medium under conditions required for growing single-crystals.

However, prior-art methods of growing single-crystals cannot ensure the elimination of the negative effect produced by single-crystal seed defects on the single-crystals being grown.

The process of selection of single-crystal seeds having suitable quality may last for several years during which scores of costly tests are to be performed. Thus, in order to produce high-grade sodalite single-crystal seeds by conventional methods for growing single-crystals to be used in optics, it is necessary to perform about ten successive two-month tests.

While growing single-crystals on single-crystal seeds according to known methods, a predetermined crystallization temperature must be strictly maintained. Thus, for instance, in a known method of growing sodalite the tolerable deviation from the predetermined temperature is ±0.2°C.

It is the main object of the present invention to provide a method which ensures the growing of a single crystal on a single crystal seed, said crystal being of more perfect structure which is free of defects found in the single crystal seed.

Another no less important object of the invention is to reduce the number of selection cycles for producing high-grade single-crystals to be used as single-crystal seeds.

Still another object of the invention is to conduct the crystallization process under less strict conditions.

A further important object of the invention lies in the use in growing single-crystals of single-crystal seeds having chemical composition and/or structure other than that of the single-crystal being grown.

These and other objects of the invention are accomplished by provision of a method of growing a single-crystal on a single-crystal seed, comprising the step of placing said single-crystal seed into a crystallization medium under conditions required for growing a single-crystal, wherein, according to the invention, prior to the beginning of crystallization there is deposited onto the surface to be overgrown, which constitutes at least one portion of the single-crystal seed, a continuous layer of a material, said material having at least one of the characteristics chemical composition and/or structure which differs from that of the material of the single-crystal seed. The information layer, on the one hand is capable of acquiring polarization properties under the influence of the single-crystal seed, which are retained during crystallization, and, on the other hand, is of a thickness such as to eliminate the defects of the surface of the single-crystal seed and to retain polarization properties acquired from the single-crystal seed, whereafter a single-crystal is grown on the layer of the material covering the single-crystal seed.

This method allows for growth of single-crystals of a more perfect structure, as well as a considerable reduction of the time required for growing defectless single-crystals, particularly single-crystals free of dislocations and fractures, with the process being conducted under less strict crystallization conditions.

The above-mentioned layer may be deposited onto a single-crystal seed prepared of a material having at least one of the characteristics of chemical composition and/or structure which differs from that of the single-crystal being grown, upon compliance with the conditions required for growing a predetermined single-crystal.

This allows the growth of a single-crystal having no corresponding suitable single-crystal seeds, on single-crystal seeds prepared of another material.

It is desirable to use metals as the material to be deposited in the form of a layer onto the surface of the single-crystal seed surface to be over grown.

The use of metals, such as gold, silver, platinum, copper and nickel, makes it possible to produce on single-crystal seeds layers resistant to many chemically aggressive crystallization media. In some cases, there will be no strong adhesion (cohesion) between the metallic layer and single-crystals being grown, so that single-crystal seeds can be separated from the grown single-crystals and reused. Furthermore, use of metallic layers ensures improved heat removal from the single-crystal seed in the course of crystallization.

A dielectric layer may also be deposited onto the surface of a single-crystal seed to be overgrown.

The deposition of a dielectric layer, such as, for instance, $ZrO_2$, $Al_2O_3$, $SiO_2$, will allow for application of the method according to the invention for growing single-crystals having a high melting point.

A semiconductor layer may be deposited onto the surface of the single-crystal seed to be overgrown.

The use of semiconductors will allow a wide-range control of polarization properties of the layers deposited onto the single-crystal seed, thereby varying the conditions of growing a single-crystal.

It is advantageous that a layer of the above-mentioned material be deposited onto the surface of the single-crystal seed being grown by the method of thermal evaporation in vacuum.

This permits the control of polarization properties of the layers by varying evaporation conditions and composition of residual gases, whereby the growth of a single-crystal can be influenced.

It is advantageous to deposit a layer of the above-mentioned material onto the surface of a single-crystal seed to be overgrown by the method of chemical deposition.

As a result of chemical deposition of said materials the quantity of impurities added to control the polarization structure of the layers can be readily changed and, consequently, the properties of the single-crystal being grown can be controlled.

It is expedient to deposit a layer of the above-mentioned materials onto the surface of a single-crystal seed to be overgrown by the method of electrochemical deposition.

This permits the obtaining of layers exhibiting improved adhesion (cohesion) to the surface of a single-crystal seed and high strength, as well as the depositing of refractory metals and their alloys from molten media.

A layer of the above mentioned materials may be deposited onto the surface of a single-crystal seed to be overgrown by the method of cathode sputtering.

In this case the surface of a single-crystal seed can be cleaned in a glow discharge, and a layer having a high melting point may be deposited onto the single-crystal seed.

Better understanding of the invention may be had from the following description of specific embodiments of the method according to the invention with reference to the accompanying drawing, which shows a single-crystal seed, a continuous layer of a material being deposited on the surface of the single-crystal seed to be overgrown in accordance with the invention, and sodalite single-crystal grown on the external surface thereof.

The method according to the invention allows for growth of single-crystals 1 having chemical composition and structure which are indentical to those of a single-crystal seed 2; having other chemical composition and a structure which is identical to that of the single-crystal seed; having identical chemical composition, but a structure other than that of single-crystal seed, and chemical composition and structure other than those of the single-crystal seed.

To carry out the method according to the invention, prior to crystallization, there is deposited onto the entire surface of the single-crystal seed 2 or onto a portion thereof selected for the growth of the single-crystal 1, material 3 to form a continuous layer, which must be sufficiently thick to eliminate the defects of the surface and sufficiently thin so as to retain polarization properties acquired from the single-crystal seed.

A material for deposition (application, coating) onto the surface of the single-crystal seed to be overgrown may comprise metals, semiconductors and dielectrics. A layer of the above-mentioned material may be deposited onto the surface of a single-crystal seed to be overgrown by the methods of thermal evaporation, chemical or electrochemical deposition or cathode sputtering.

EXAMPLE 1

Growth of hydrosodalite single-crystal under hydrothermal conditions was carried out. Prior to the beginning of crystallization, the entire surface of a single-crystal seed 2 was coated with a continuous layer 3 of polycrystalline gold which acquires polarization properties under the influence of the single-crystal seed and withstands the attack of a crystallization medium.

The single-crystal seed of hydrosodalite comprised a lamina of a thickness of 1 mm cut out parallel to the face (110). Prior to deposition of the layer 3, the single-crystal seed was thoroughly polished, and its angles and edges were rounded. Thickness of the gold layer ranged from 500 to 2,000 Å in different tests. With a thickness in this range the layer eliminated the defects of the surface of the single-crystal seed and retained polarization properties. The gold layer was deposited by the method of thermal evaporation in vacuum.

The single-crystal seed coated with the continuous layer of gold was then placed into a autoclave filled with a 30 percent solution of NaOH. The growth was performed by the temperature difference method. A charge comprised a mixture of oxides in the form of $SiO_2$ and $Al_2O_3$. The temperature in the autoclave was 400°C, the temperature difference between the solution zone and the growth zone was 10°C, and the pressure was 400 atm. In order to prevent the single-crystal seed from being dissolved, which could result in separation of the layer deposited thereon, the autoclave was placed under operating conditions with the maximum temperature difference (of about 50°C) and with the maximum rate (of about 2 hours). Under these conditions the solution was saturated due to dissolution of the charge alone. The test duration was 30 days at an average daily face growth rate of 0.2 mm.

The single-crystal 1 of hydrosodalite grown by the method according to the invention exhibited a more perfect structure and, in particular, featured a substantially lower content of dislocations and micro and macro-fractures than the initial single-crystal seed, while the defects of the single-crystal seed were transferred from the single-crystal seed through the polarized gold layers into the grown single-crystals.

The method according to the invention permitted the elimination of the time-consuming selection of single-crystals seeds, since rather perfect hydrosodalite single-crystals were grown even on single-crystal seeds prepared of natural sodalite single-crystals which had a large number of fractures. The method according to the invention also allows the reduction of the requirements as to the accuracy of maintaining the crystallization temperature. Thus, temperature deviations of ±5°C had no negative effect on the quality of hydrosodalite single-crystals grown.

Single-crystals of hydrosodalite were also grown under the same conditions on single-crystal seeds coated with continuous polycrystalline layers of metals such as silver, platinum, copper and nickel; dielectrics such as amorphous silicon dioxide and organo-silicon polymer; and semiconductors such as amorphous and polycrystalline germanium.

EXAMPLE 2

In another embodiment of the method single-crystal seeds were used which were prepared of a material having the same chemical composition as the single-crystal being grown, but of a different atomic structure. In order to grow hydrocancrinite single-crystals, hydrosodalite single-crystal seeds were used, which had the same chemical composition as hydrocancrinite, but a different structure. Layers of polycrystalline silver of a thickness of 500–1,000 Å were chemically deposited onto single-crystal seeds of hydrosodalite, said layers withstanding alkaline crystallization medium. The single-crystal seeds were placed into an autoclave, and hydrocancrinite was grown in a 15 percent solution of NaOH at 300°C, under a pressure of 400 atm and at a temperature difference of 20°C. While it was difficult to obtain single-crystal seeds of hydrocancrinite of sufficient size and good quality, the method according to the invention permitted the use of single-crystal seeds of another material — hydrosodalite — and to obtain rather perfect hydrocancrinite single-crystals.

EXAMPLE 3

As an example of an embodiment of the method of growing a single-crystal using a single-crystal seed having other chemical composition than the single-crystals being grown, the reference is made to growth of potassium iodide single-crystals from a melt by the Kyropoulos method. Single-crystal seeds comprised mica (muscovite) single-crystals. Continuous layers of polycrystalline gold of a thickness of 500–1,000 Å were deposited onto the surface of mica, by the method of thermal evaporation in vacuum. The single-crystal seeds coated with gold layers were placed into a melt of potassium iodide.

EXAMPLE 4

As an example of an embodiment of the method of growing a single-crystal using a continuous layer deposited on a single-crystal seed, which layer is identical as to the chemical composition both to the single-crystal seed and to the single-crystal being grown, but differs therefrom as to its structure, reference is made to the growth of germanium single-crystal on a germanium single-crystal seed with an amorphous germanium layer deposited thereon. The layers of amorphous germanium were deposited onto the surface of single-crystal seeds at room temperature by the method of thermal deposition in vacuum. The thickness of the layers was of 50–200 A. Germanium single-crystal seed with the layers deposited thereon from gaseous phase under known per se conditions.

EXAMPLE 5

As an example of an embodiment of the method of growing a single-crystal using a single-crystal seed having other chemical composition, but identical atomic structure with the single-crystal being grown, reference is made to the growth of aluminium potassium sulphate on a single-crystal seed prepared from chromic potassium sulphate. Continuous layers of polycrystalline gold were deposited onto the surface of single-crystals seed by the method of thermal evaporation in vacuum. The thickness of the layers was 300–800 A. Single-crystals were grown by slowly reducing the temperature in conventional equipment.

EXAMPLE 6

The growth of lead sulphide single-crystals was carried out from gaseous phase on single-crystal seeds of lead sulphide, on which continuous layers of amorphous and polycrystalline germanium were deposited by the method of thermal evaporation in vacuum. The thickness of the layers was 100–200 A. The single-crystal seeds were placed into a conventional crystallization chamber. Sublimation of lead sulphide was performed at 1,000°C in a stream of preheated nitrogen. The temperature of the single-crystal seed was 500°C.

Polycrystalline silver layers of a thickness of 200–500 A were deposited onto the surface of the single-crystal seeds by the method of thermal evaporation in vacuum, and alternatively layers of amorphous aluminum oxide and zirconium oxide were deposited with a thickness of 50–100 A by the method of reactive cathode sputtering. For some single-crystal seeds only some portions of the surface were coated with continuous layers of said thickness. The remaining portions of the surface were protected with masks during crystallization, whereby single-crystals were grown only in some zones of single-crystal seeds.

EXAMPLE 7

The growth of single-crystal of Seignette salt was carried out from an aqueous solution. A continuous layer of silver was chemically deposited onto the surface of a single-crystal seed of Seignette salt cut parallel to the face (001). The thickness of the layers was 300–1,000 A. The single-crystal seeds with the layers deposited thereon were placed into a conventional crystallization apparatus, and the growth was conducted under known per se conditions.

EXAMPLE 8

The growth of single-crystal of Seignette salt on a single-crystal seed coated with a continuous layer deposited was carried out by the electrochemical method. Single-crystal seeds of Seignette salt were cut parallel by to the face (001), and a layer of polycrystalline silver was deposited onto their surface with a thickness of 100–150 A by the method of thermal evaporation in vacuum. Then nickel was electrochemically deposited onto the single-crystal seed from an aqueous solution. The thickness of the nickel layers was 400–1,000 A. The single-crystal seed with the layers deposited thereon was placed into a conventional crystallization apparatus, and single-crystals of Seignette salt were grown under known per se conditions.

In all the cases the method according to the invention ensured the growth of single-crystals of rather perfect structure and free of defects which were present in the single-crystal seed.

What is claimed is:

1. A method of growing a single-crystal on a single-crystal seed comprising the steps of: depositing prior to the beginning of crystallization onto the surface to be overgrown, which constitutes at least one portion of said single-crystal seed, a layer of a material, said material having at least one of the characteristics of chemical composition or structure which differs from that of the material of said single-crystal seed, said layer on the one hand being capable of acquiring polarization properties under the influence of the material of the single-crystal seed which are retained during crystallization, and on the other hand being of a thickness such as to eliminate the defects of the surface of said single-crystal seed and to retain polarization properties acquired from said single-crystal seed; placing said single-crystal seed with said layer deposited thereon into a crystallization medium under conditions required for growing said single-crystal, and growing a single-crystal on the layer of the material covering said single-crystal seed.

2. A method of growing a single-crystal on a single-crystal seed comprising the steps of: producing a single-crystal seed of a material having at least one of the characteristics of chemical composition or structure which differs from that of a predetermined material of the single-crystal being grown; depositing prior to the beginning of crystallization onto at least one portion of the surface of said single-crystal seed a continuous layer of a material having at least one of the characteristics of chemical composition or structure which differs from that of a material of said single-crystal seed, said layer on the one hand being capable of acquiring polarization properties under the influence of the single-crystal seed which are retained during crystallization, and on the other hand being of a thickness such as to eliminate the defects of the surface of said single-crystal seed and to retain polarization properties acquired from said single-crystal seed; placing said single-crystal seed with said layer deposited thereon into a crystallization medium under conditions required for growing said single-crystal, and growing a single-crystal on the layer of the material covering said single-crystal seed.

3. A method according to claim 1, wherein a layer of one of the materials selected from the group consisting of metal, dielectric and semiconductor is deposited onto the surface of said single-crystal seed to be overgrown.

4. A method according to claim 2, wherein a layer of one of the materials selected from the group consisting of metal, dielectric and semiconductor is deposited onto the surface of said single-crystal seed to be overgrown.

5. A method according to claim 1, wherein a layer of said material is deposited onto the surface of said single-crystal seed to be overgrown by the method of thermal evaporation in vacuum.

6. A method according to claim 1, wherein a layer of said material is deposited onto the surface of said single-crystal seed to be overgrown by the method of chemical deposition.

7. A method according to claim 1, wherein a layer of said material is deposited onto the surface of said single-crystal seed to be overgrown by the method of electrochemical deposition.

8. A method according to claim 1, wherein a layer of said material is deposited onto the surface of said single-crystal seed to be overgrown by the method of cathode sputtering.

9. A method according to claim 2, wherein a layer of said material is deposited onto the surface of said single-crystal seed to be overgrown by the method of thermal evaporation in vacuum.

10. A method according to claim 2, wherein a layer of said material is deposited onto the surface of said single-crystal seed to be overgrown by the method of chemical deposition.

11. A method according to claim 2, wherein a layer of said material is deposited onto the surface of said single-crystal seed to be overgrown by the method of electrochemical deposition.

12. A method according to claim 2, wherein a layer of said material is deposited onto the surface of said single-crystal seed to be overgrown by the method of cathode sputtering.

* * * * *